US012770410B2

(12) United States Patent
Wache et al.

(10) Patent No.: US 12,770,410 B2
(45) Date of Patent: Oct. 20, 2026

(54) METHOD FOR CREATING A LANE MODEL

(71) Applicant: Continental Autonomous Mobility Germany GmbH, Ingolstadt (DE)

(72) Inventors: Jonathan Wache, Bregenz (AT); Dennis Kinder, Stuttgart (DE); Andreas Löffler, Weiler-Simmerberg (DE); Dieter Krökel, Eriskirch (DE)

(73) Assignee: Continental Autonomous Mobility Germany GmbH, Ingolstadt (DE)

(*) Notice: Subject to any disclaimer, the term of this patent is extended or adjusted under 35 U.S.C. 154(b) by 461 days.

(21) Appl. No.: 18/468,291

(22) Filed: Sep. 15, 2023

(65) Prior Publication Data

US 2024/0096112 A1 Mar. 21, 2024

(30) Foreign Application Priority Data

Sep. 15, 2022 (DE) ..................... 10 2022 209 713.0

(51) Int. Cl.
*G06V 20/56* (2022.01)
*B60W 40/072* (2012.01)
(Continued)

(52) U.S. Cl.
CPC ......... *G06V 20/588* (2022.01); *B60W 40/072* (2013.01); *G06V 10/44* (2022.01);
(Continued)

(58) Field of Classification Search
CPC ...... G06V 20/588; G06V 10/44; G06V 10/80; G06V 10/809; B60W 40/072; B60W 2420/403; B60W 2420/408
See application file for complete search history.

(56) References Cited

U.S. PATENT DOCUMENTS

2016/0148059 A1* 5/2016 Kawano ............... G06V 20/588 382/104
2018/0067494 A1* 3/2018 Schiffmann ............... G06T 7/70
(Continued)

FOREIGN PATENT DOCUMENTS

CN 105667518 A * 6/2016 ............ B60W 40/06
CN 106096525 A * 11/2016 ............ G06F 18/25
(Continued)

OTHER PUBLICATIONS

Translated version of CN 106096525 (Year: 2016).*
(Continued)

*Primary Examiner* — Carol W Chan
(74) *Attorney, Agent, or Firm* — Fitch, Even, Tabin & Flannery LLP

(57) ABSTRACT

A method for creating a lane model by at least one first and at least one second environment detection sensor of an ego-vehicle, including: recording the environment of the ego-vehicle with the at least one first and the at least one second environment detection sensor; evaluating the sensor data from the sensor recording; determining a roadway from the sensor data; extracting detections of the at least one first environment detection sensor, which may be assigned to the roadway; estimating a ground plane and/or ground curvature based on the sensor data of the at least one first environment detection sensor; providing the estimation of the ground plane and/or ground curvature; creating a lane model, wherein the estimation of the ground plane and/or ground curvature as well as the sensor data of the at least one second environment detection sensor are fused to produce the lane model.

10 Claims, 1 Drawing Sheet

(51) Int. Cl.
*G06V 10/44* (2022.01)
*G06V 10/80* (2022.01)

(52) U.S. Cl.
CPC ....... *G06V 10/80* (2022.01); *B60W 2420/403* (2013.01); *B60W 2420/408* (2024.01)

(56) References Cited

U.S. PATENT DOCUMENTS

| | | | | |
|---|---|---|---|---|
| 2020/0218907 | A1* | 7/2020 | Baik | G06F 17/16 |
| 2020/0231164 | A1* | 7/2020 | Vladimerou | G05D 1/0276 |
| 2021/0163001 | A1* | 6/2021 | Choi | B60W 30/16 |
| 2022/0343637 | A1* | 10/2022 | Zhou | G06V 20/588 |

FOREIGN PATENT DOCUMENTS

| | | | |
|---|---|---|---|
| DE | 102010032063 | A1 | 5/2011 |
| DE | 102010048760 | A1 | 7/2011 |

OTHER PUBLICATIONS

Huang, Albert S., David Moore, Matthew Antone, Edwin Olson, and Seth Teller. "Finding multiple lanes in urban road networks with vision and lidar." Autonomous Robots 26, No. 2 (2009): 103-122. (Year: 2009).*

Janda, Florian, Sebastian Pangerl, Eva Lang, and Erich Fuchs. "Road boundary detection for run-off road prevention based on the fusion of video and radar." In 2013 IEEE Intelligent Vehicles Symposium (IV), pp. 1173-1178. IEEE, 2013. (Year: 2013).*

German Office Action dated Apr. 4, 2023 for the German Patent Application No. 10 2022 209 713.0 from which this application claims priority.

Dae-Hyun Kim., "Lane Detection Method with Impulse Radio Ultra-Wideband Radar and Metal Lane Reflectors", Sensors 2020, 20, 324; doi:10.3390/s20010324.

Qingquan Li et al., "A Sensor-Fusion Drivable-Region and Lane-Detection System for Autonomous Vehicle Navigation in Challenging Road Scenarios", IIEEE Transactions on Vehicular Technology, vol. 63, Issue: 2, pp. 540-555, Feb. 2014, DOI: 10.1109/TVT.2013.2281199.

Daniel Clarke et al., "Synthetic Aperture Radar for Lane Boundary Detection in Driver Assistance Systems", 2016 IEEE International Conference on Multisensor Fusion and Integration for Intelligent Systems (MFI), Sep. 19-21, 2016, DOI: 10.1109/MFI.2016.7849495, 2016 IEEE Conference on Multisensor Fusion and Integration for Intelligent Systems (MFI), Baden-Baden, Germany, 2016, pp. 238-243.

* cited by examiner

METHOD FOR CREATING A LANE MODEL

CROSS-REFERENCE TO RELATED APPLICATIONS

The present application claims the benefit and/or priority of German Patent Application No. 10 2022 209 713.0 filed on Sep. 15, 2022, the content of which is incorporated by reference herein.

TECHNICAL FIELD

The invention relates to a method for creating a lane model as well as a system for executing the method.

BACKGROUND

It is known from the prior art that, for assisted and highly automated driving functions such as highway pilots or fully automated parking without driver intervention, sensor systems are required which, in addition to recognizing other road users, also identify lanes robustly at large distances. On the basis of the lane recognition, a robust assignment of road users to lanes is necessary.

In addition to individual sensors, e.g., the installation of a front camera or a front radar, these are also installed jointly. In this case, a surroundings model including the relevant road users is formed separately nowadays, from the camera sensor and the radar sensor. The surroundings model is combined and the plausibility thereof is checked at object level. In particular, the lane recognition is based purely on camera data since the radar sensor is inherently unable to detect any lane markings which are currently used. There are moves to equip lane markings with radar reflectors so that radar sensors may detect these as well.

In addition to camera-based lane recognition, it is also possible to detect lane markings with the aid of a lidar sensor.

The disadvantage of the previously known sensors and methods is that, e.g., in the case of camera-based lane recognition, the long-range lane is only depicted in the camera model with a few pixels, which makes the task of detecting the course of the lane in particular at large distances very demanding and frequently prone to errors. Due to these problems, it is frequently difficult to assign lanes to road users at large distances. A flat world is, as a general rule, the basic assumption for camera-based lane recognition. This is frequently violated which, in turn, leads to erroneous results and the problems already described.

Furthermore, the disadvantage of the radar reflectors in the lane markings approach is that structural changes are necessary to the markings on the road for this approach to work, and this involves not inconsiderable expense. Furthermore, they also have to be maintained and regularly replaced depending on their design.

Lane detection with lidar is accordingly problematic since lidar sensors still represent a high cost factor compared with pure camera or radar systems. What also matters is that the range of lidars for lane recognition is inherently limited.

SUMMARY

It is therefore an object of the present disclosure to provide a method and a system, by means of which a lane model is created, which has an improved range as well as improved accuracy.

This object is addressed by the independent claims 1 and 4. Further advantageous configurations and embodiments are the subject-matter of the subclaims.

Initial considerations were that an enormous amount of progress has been made in the field of radar sensor technology in the last few years. In particular, not only may newly developed radar sensors measure horizontally nowadays, but they also have the capacity to measure elevation, making possible an accuracy of elevation measurement of up to one-tenth of a degree. In particular, improving the elevation resolution for radar systems for assisted and automated driving is particularly advantageous. In particular, knowledge of a roadway curvature is advantageous since, in the case of camera-based lane recognition, the basic assumption of a flat world is taken as a starting point, which is however not appropriate in all cases.

According to the present disclosure, a method for creating a lane model by means of at least one first and at least one second environment detection sensor of an ego-vehicle is therefore proposed, having the following steps of:

- recording the environment of the ego-vehicle with the at least one first and the at least one second environment detection sensor;
- evaluating the sensor data from the recording of the at least one first and second environment detection sensors;
- determining a roadway from the sensor data;
- extracting detections of the at least one first environment detection sensor, which may be assigned to the roadway;
- estimating a ground plane and/or ground curvature based on the sensor data of the at least one first environment detection sensor;
- providing the estimation of the ground plane and/or ground curvature;
- creating a lane model, wherein the estimation of the ground plane and/or ground curvature as well as the sensor data of the at least one second environment detection sensor are fused to produce the lane model.

The first and the second environment detection sensors may be different types of sensors. This is advantageous since various types of sensors offer different advantages during the detection of specific features in the surroundings. Thus, a camera may, for example, detect the lane markings better than a radar sensor.

In general, the term “roadway” includes multiple lanes, also lanes which have a traffic direction opposite the direction of travel of the ego-vehicle and, if necessary, are also physically delimited by a lane boundary. The term “lane” may include one or more lanes having the same traffic alignment, and in the present case corresponding to the direction of travel of the ego-vehicle.

Accordingly, it is conceivable that the at least one first environment detection sensor is a radar sensor and the at least one second environment detection sensor is a camera.

It would also be conceivable to combine more than two environment detection sensors.

When extracting the detections of the first environment detection sensor, the previously evaluated sensor data are used and analyzed in terms of the corresponding detections. The detections may be located directly on the roadway and, consequently, be assigned to the roadway or, due to their spatial proximity to the roadway, be accordingly assigned to the roadway. For example, roadway or lane boundaries are always arranged in a spatial proximity to the roadway.

The ground curvature is a vertical change in the ground plane. Accordingly, when estimating the ground plane, a linear deviation from the flat world assumption may be estimated. Furthermore, it may be estimated whether it involves a rise or a fall in the ground plane.

The estimation of the ground plane and/or ground curvature may be provided in an arithmetic unit in which the estimation is fused with the sensor data of the at least one second environment detection sensor. It would also be conceivable that the estimation is provided directly to the at least one second environment detection sensor, so that the sensor data generated by the second environment detection sensor already take account of this estimation and the detections are accordingly corrected in the second sensor.

As a result of the fusion of the estimation of the ground plane and/or ground curvature as well as the sensor data of the at least one second environment detection sensor, an advantageous lane model may be created since this process not only considers the course of the lane, but also a change in height. Accordingly, a more precise lane model is provided which, in turn, provides advantages during the object detection since, if the height differences of the lane are known, the distance from the object and also the size of the object can be established more accurately.

It would also be conceivable for the recording of the environment detection sensors to be provided to a neural network. The network may be trained such that it knows curved roadways and can therefore process the detections and estimates accordingly. Consequently, the network may then correctly output, e.g., the roadway markings, as real-world coordinates.

In a configuration, the estimation of the ground plane and/or ground curvature is carried out based on sensor data of a radar sensor, wherein an elevation measurement is carried out by the radar sensor for this purpose. It is advantageous to use a radar sensor since it is possible, thanks to a radar sensor having elevation resolution or an elevation measuring capacity, to detect a change in roadway curvature of less than 0.5 m at a distance of 200 m.

It is further understood that the extracted detections of the at least one first environment detection sensor include objects on the roadway and/or at the edge of the roadway. Accordingly, in one configuration, the radar detections of the objects on the roadway such as, for example, other road users or objects which can generally be detected with the radar sensor as well as objects at the edge of the roadway such as, for example, a guardrail or peripheral developments are, in this case, extracted. In particular, the detections at the edge of the roadway, which constitute a roadway or a lane boundary are advantageous since, for example, the width of the roadway and the rough course of the roadway may thus already be determined.

Furthermore, a system for creating a lane model in an ego-vehicle is proposed according to the present disclosure, including at least one first and at least one second environment detection sensor for recording the environment of the ego-vehicle, an evaluation unit for evaluating the sensor data of the at least one first and at least one second environment detection sensor as well as an arithmetic unit for determining a roadway, for extracting detections of the at least one first environment detection sensor, which can be assigned to the roadway, for estimating a ground plane and/or ground curvature based on the sensor data of the at least one first environment detection sensor, for providing the estimation as well as for creating the lane model by fusing the estimation of the ground plane and/or ground curvature and the sensor data of the at least one second environment detection sensor.

The arithmetic unit can, for example, be a central control unit such as an ECU or an ADCU. It would also be conceivable for the arithmetic unit to be part of one of the sensors and for the corresponding method steps to take place in one of the sensors.

In a configuration, the at least one first environment detection sensor is a radar sensor.

In a further embodiment, the radar sensor is configured such that an elevation measurement may be carried out.

In a configuration, the at least one second environment detection sensor is a camera sensor. A camera sensor is, accordingly, in particular advantageous since, e.g., lane markings may be detected simply and precisely with a camera.

BRIEF DESCRIPTION OF THE DRAWINGS

Further advantageous configurations and embodiments are the subject-matter of the drawings, wherein.

DETAILED DESCRIPTION

Figure 1:
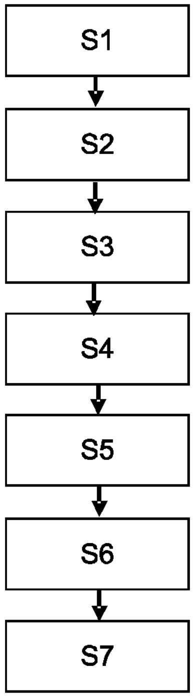
FIG. 1: shows a schematic flow chart of the method according to one configuration of the present disclosure.

FIG. 1 shows a schematic flow chart of the method according to one configuration of the present disclosure. In step S1, the environment of the ego-vehicle is recorded with the at least one first 2*a* and the at least one second environment detection sensor 2*b*. In step S2, the sensor data from the recording of the at least one first 2*a* and second environment detection sensors 2*b* are evaluated. In step S3, a roadway is determined from the sensor data. In step S4, detections of the at least one first environment detection sensor 2*a* are extracted, which may be assigned to the roadway. In step S5, a ground plane and/or a ground curvature is/are estimated based on the sensor data of the at least one first environment detection sensor. In step S6, the estimation of the ground plane and/or the ground curvature is provided and, in step S7, a lane model is created, wherein the estimation of the ground plane and/or ground curvature as well as the sensor data of the at least one second environment detection sensor 2*b* are fused to produce the lane model. If a neural network is used, steps S2 to S7 would take place in the neural network. The lane model would then already be created in real-world coordinates and output by the trained network.

Figure 2:
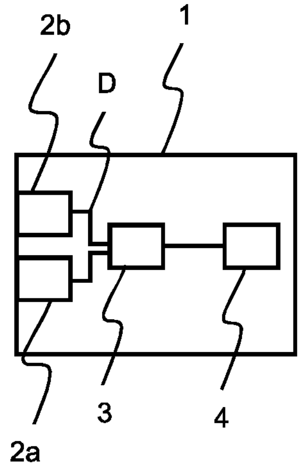
FIG. 2: shows a schematic representation of a system according to one embodiment of the present disclosure.

FIG. 2 shows a schematic representation of a system according to one embodiment of the present disclosure. The system 1 includes a first environment detection sensor 2*a* as well as a second environment detection sensor 2*b*, an evaluation unit 3 for evaluating the sensor data of the first 2*a* and the second environment detection sensors 2*b*, and an arithmetic unit 4. The arithmetic unit 4 is configured to determine a roadway, to extract detections of the at least one first environment detection sensor 2*a*, which be assigned to the roadway, to estimate a ground plane and/or ground curvature based on the sensor data of the at least one first environment detection sensor 2*a*, to provide the estimation and to create the lane model by fusing the estimation of the ground plane and/or ground curvature and the sensor data of the at least one second environment detection sensor 2*b*. The environment detection sensors 2*a*, 2*b* are connected to the evaluation device 3 via a data link D. The evaluation unit 3 is, in turn, likewise connected to the arithmetic unit 4 via a data link D. The data link D may be configured to be wired or wireless. The arithmetic unit 4 may, for example, be a central control unit ECU. It would also be conceivable for the arithmetic unit 4 to be part of one of the sensors 2*a*, 2*b*.

LIST OF REFERENCE NUMERALS

1 System
2*a* First environment detection sensor
2*b* Second environment detection sensor
3 Evaluation unit
4 Arithmetic unit
D Data link
S1-S7 Method steps

The invention claimed is:

1. A method for creating a lane model by at least one first environment detection sensor and at least one second environment detection sensor of an ego-vehicle, the method comprising:

recording an environment of the ego-vehicle with the at least one first environment detection sensor and the at least one second environment detection sensor;

evaluating sensor data from the recording of the at least one first environment detection sensor and the at least one second environment detection sensor;

determining, by an arithmetic unit including a central controller having an input connected to an output of an evaluation unit, a roadway from the sensor data; extracting, by the arithmetic unit, detections of the at least one first environment detection sensor, which are assigned to the roadway;

estimating, by the arithmetic unit, at least one of a ground plane or a ground curvature based on sensor data of the at least one first environment detection sensor;

providing, by the arithmetic unit, the estimation of the at least one of the ground plane or the ground curvature; and creating, by the arithmetic unit, the lane model, wherein the estimation of the at least one of the ground plane or the ground curvature as well as sensor data of the at least one second environment detection sensor are fused to produce the lane model;

wherein the estimation of the at least one of the ground plane or the ground curvature is provided to the at least one second environment detection sensor such that recorded data of the at least one second environment detection sensor is corrected based on the estimation before fusion.

2. The method according to claim 1, wherein the estimation of the at least one of the ground plane or the ground curvature is carried out based on sensor data of a radar sensor, the at least one first environment detection sensor comprising the radar sensor, wherein an elevation measurement is carried out by the radar sensor.

3. The method according to claim 1, wherein the extracted detections of the at least one first environment detection sensor comprise at least one of objects on the roadway or at an edge of the roadway.

4. A system for creating a lane model in an ego-vehicle, comprising:

at least one first environment detection sensor and at least one second environment detection sensor for recording an environment of the ego-vehicle, an evaluation unit having at least one first input connected to an output of the at least one first environment detection sensor, having at least one second input connected to an output of the at least one second environment detection sensor, and having an output; and an arithmetic unit comprising a central controller having an input connected to the output of the evaluation unit, the arithmetic unit configured for determining a roadway, for extracting detections of the at least one first environment detection sensor, which are assigned to the roadway, for estimating at least one ground plane or ground curvature based on sensor data of the at least one first environment detection sensor, for providing the estimation as well as for creating the lane model by fusing the estimation of the at least one of the ground plane or the ground curvature and sensor data of the at least one second environment detection sensor;

wherein the estimation of the at least one of the ground plane or the ground curvature is provided to the at least one second environment detection sensor such that recorded data of the at least one second environment detection sensor is corrected based on the estimation before fusion.

5. The system according to claim 4, wherein the at least one first environment detection sensor comprises a radar sensor.

6. The system according to claim 5, wherein the radar sensor is configured such that an elevation measurement is carried out.

7. The system according to claim 4, wherein the at least one second environment detection sensor comprises a camera sensor.

8. A system for creating a lane model in an ego-vehicle, comprising:

at least one first environment detection sensor and at least one second environment detection sensor for recording an environment of the ego-vehicle, and an arithmetic unit comprising a central controller, the arithmetic unit configured for determining a roadway, for extracting detections of the at least one first environment detection sensor, which are assigned to the roadway, for estimating at least one ground plane or ground curvature based on sensor data of the at least one first environment detection sensor, for providing the estimation as well as for creating the lane model by fusing the estimation of the at least one of the ground plane or the ground curvature and sensor data of the at least one second environment detection sensor;

wherein the estimation of the at least one of the ground plane or the ground curvature is provided to the at least one second environment detection sensor such that recorded data of the at least one second environment detection sensor is corrected based on the estimation before fusion.

9. The system according to claim 8, wherein the estimation of the at least one of the ground plane or the ground curvature is carried out based on sensor data of a radar sensor, the at least one first environment detection sensor comprising the radar sensor, wherein an elevation measurement is carried out by the radar sensor.

10. The system according to claim 8, wherein the extracted detections of the at least one first environment detection sensor comprise at least one of objects on the roadway or at an edge of the roadway.

* * * * *